(12) United States Patent
Metcalf

(10) Patent No.: US 9,902,433 B2
(45) Date of Patent: Feb. 27, 2018

(54) VENTING MODULE FOR VEHICLE COMPARTMENT COVER ASSEMBLY

(71) Applicant: GM GLOBAL TECHNOLOGY OPERATIONS LLC, Detroit, MI (US)

(72) Inventor: Steven A. Metcalf, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 22 days.

(21) Appl. No.: 15/208,791

(22) Filed: Jul. 13, 2016

(65) Prior Publication Data

US 2018/0015959 A1 Jan. 18, 2018

(51) Int. Cl.
*B62D 25/12* (2006.01)
*B62D 25/10* (2006.01)

(52) U.S. Cl.
CPC .......... *B62D 25/12* (2013.01); *B62D 25/105* (2013.01)

(58) Field of Classification Search
CPC ...... B62D 25/12; B62D 25/105; B62D 65/04; B62D 65/06; B60J 1/007; B60J 1/20; B60J 1/2008
See application file for complete search history.

(56) References Cited

U.S. PATENT DOCUMENTS

| | | | | |
|---|---|---|---|---|
| 2,386,151 A | * | 10/1945 | Trautvetter | E06L 33/5892 52/204.597 |
| 3,646,876 A | * | 3/1972 | Atkinson | B60H 1/247 454/141 |
| 4,153,291 A | * | 5/1979 | Conti | B60J 9/00 180/69.2 |

(Continued)

FOREIGN PATENT DOCUMENTS

| | | | | |
|---|---|---|---|---|
| DE | 19732308 A1 | * | 2/1998 | ............... B60J 5/00 |
| DE | 20106361 U1 | * | 8/2001 | ........... B62D 25/105 |
| GB | 2403695 A | * | 1/2005 | ............. B60R 21/34 |

OTHER PUBLICATIONS

Engine Bonnet parts diagram for Ferrari 360 Spider (2000-2005), http://www.eurospares.com.uk, retrieved Sep. 30, 2017 (Year: 2017).*

(Continued)

*Primary Examiner* — James A Shriver, II
*Assistant Examiner* — Steve Clemmons
(74) *Attorney, Agent, or Firm* — Quinn IP Law

(57) ABSTRACT

Venting modules for vehicle compartment covers, methods for making and methods for using such venting modules, and motor vehicles with a vented compartment cover assembly are disclosed. Disclosed, for example, is a venting module for a vehicle compartment cover assembly. The compartment cover assembly includes a center panel and a closure panel, which mounts to a motor vehicle. The venting module includes an arcuate carrier frame that seats within a window of the closure panel and circumscribes most or all of the center panel. A support flange projects from the carrier frame and attaches to the center panel of the compartment cover assembly. An attachment tab projects from the carrier frame and attaches to the closure panel of the compartment cover assembly. A mesh screen is attached to the carrier frame. The mesh screen includes a lattice mesh structure with an interstice array having a predetermined thermal venting area.

20 Claims, 3 Drawing Sheets

(56) References Cited

U.S. PATENT DOCUMENTS

| | | | | |
|---|---|---|---|---|
| 4,712,287 | A | * | 12/1987 | Johnston ................. B60J 1/008 |
| | | | | 29/458 |
| 5,906,697 | A | * | 5/1999 | Hasegawa ................ B60J 1/006 |
| | | | | 156/108 |
| 7,886,859 | B2 | * | 2/2011 | Caldirola ............... B60K 11/08 |
| | | | | 123/41.59 |
| D700,549 | S | * | 3/2014 | Capristo ...................... D12/173 |
| D700,550 | S | * | 3/2014 | Capristo ...................... D12/173 |
| 8,678,483 | B2 | * | 3/2014 | Quirk ........................ B60J 1/00 |
| | | | | 180/69.24 |
| 8,777,299 | B2 | * | 7/2014 | Langford, Jr. ......... B62D 25/10 |
| | | | | 180/69.2 |
| 8,827,358 | B2 | * | 9/2014 | Rocheblave ......... B62D 25/105 |
| | | | | 180/69.2 |
| 2004/0050601 | A1 | * | 3/2004 | Tsiaousopoulos ...... B60R 13/02 |
| | | | | 180/69.22 |
| 2014/0117721 | A1 | * | 5/2014 | Ring ..................... B62D 25/12 |
| | | | | 296/193.11 |

OTHER PUBLICATIONS

Hood Louver Total Open Areas, http://www.hoodlouvers.com, retrieved Sep. 30, 2017 (Year: 2014).*

Ferrari 360 Spider (2000), http://auto.ferrari.com; retrieved Oct. 2, 2017 (Year: 2017).*

* cited by examiner

VENTING MODULE FOR VEHICLE COMPARTMENT COVER ASSEMBLY

TECHNICAL FIELD

The present disclosure relates generally to compartment cover assemblies for motor vehicles, such as the engine hood, trunk lid, side doors, and roof cover. More specifically, aspects of this disclosure relate to vented engine hood assemblies for motor vehicles with a rear-engine or a mid-engine layout.

BACKGROUND

Current production motor vehicles, such as the modern-day automobile, are originally equipped with compartment cover assemblies that are movably mounted to the vehicle body to provide access to the vehicle's various compartments. Driver-side and passenger-side vehicle doors, for example, can be opened and closed to allow user access for entering and exiting the passenger compartment. In contrast, the hood (or "bonnet" in some countries) extends over and covers the vehicle's engine compartment to prevent theft or damage of the engine components. On passenger cars, the hood is typically hinged to a forward portion of the body in white (BIW) to allow access to the engine compartment for assembly and maintenance. For motor vehicles with a mid-engine or a rear-engine layout, the engine compartment and, thus, the hood are located towards the middle or rear of the vehicle as opposed to the forward location of most conventional vehicle designs.

When a motor vehicle is parked outside on a sunny day with the windows, doors and hood closed, the solar load can quickly heat both the passenger and engine compartments well beyond the outside ambient temperature. On a typical 90 degrees Fahrenheit (° F.) sunny day, for example, inside vehicle temperatures can exceed 140° F. Under normal vehicle operating conditions when the engine is running and under load, engine compartment temperatures can exceed 400° F. Possible measures for alleviating excessive heating within the engine compartment include thermal wrapping the exhaust runners, thermal coating the headers and manifolds, high-performance radiators, high-output coolant pumps, and electric cooling fans. As another option, some vehicle hood assemblies are provided with air vents to increase convective cooling within the engine compartment.

SUMMARY

Disclosed herein are venting modules for vehicle compartment cover assemblies, methods for making and methods for using such venting modules, and motor vehicles with a compartment cover assembly including a venting module. By way of example, and not limitation, an improved venting glass module for an engine hood assembly is disclosed. As a representative application, the venting glass module can be incorporated into an engine hood of a mid-engine or rear-engine vehicle to provide structural support for a back glass panel, in addition to providing improved radiative and convective cooling for the engine bay. For at least some configurations, the venting glass module includes a cast magnesium mesh superposed within an integrally formed carrier frame. The back glass is bonded onto a support flange that extends along an inner perimeter of the carrier frame. Attachment tabs that are spaced along the outer perimeter of the carrier frame attach to a liftgate portion of the engine hood assembly.

Attendant benefits for at least some of the disclosed concepts include providing improved structural support for the back glass, increased structure to the liftgate, and enhanced venting for the engine bay. The disclosed venting glass modules can provide, for example, 200-225% more venting than some traditional designs. Disclosed venting modules can provide continuous, economical venting of compartment heat without requiring expensive electric fans or high-output coolant pumps. Other advantages can include reduced design complexity and the elimination of the bridging structure from prior glass hood designs, both of which aid manufacturing and ease of installation when mounting the module to the vehicle. At least some of the disclosed designs further offer mass reduction which translates into increased fuel economy.

Aspects of the present disclosure are directed to venting modules for vehicle compartment covers. For example, a venting module for a compartment cover assembly of a motor vehicle is disclosed. The compartment cover assembly, which may be in the nature of an engine hood, a trunk lid or other compartment cover, includes a center panel and a closure panel, the former of which may be a back glass and the latter of which is configured to attach to vehicle structure of the motor vehicle. The venting module includes an arcuate carrier frame that is configured to seat within a window of the closure panel and circumscribe at least a portion of the center panel. A support flange, which projects from the arcuate carrier frame, is configured to attach to the center panel of the compartment cover assembly. An attachment tab, which also projects from the arcuate carrier frame, is configured to attach to the closure panel of the compartment cover assembly. A mesh screen is attached to (e.g., integrally formed with) the arcuate carrier frame. The mesh screen includes a lattice mesh structure with an interstice array having a predetermined thermal venting area.

Other aspects of the present disclosure are directed to motor vehicles with internal compartments covered by vented cover assemblies. A "motor vehicle," as used herein, may include any relevant vehicle platform, such as passenger vehicles (internal combustion engine (ICE), hybrid, electric, fuel cell, etc.), industrial vehicles, buses, all-terrain vehicles (ATV), motorcycles, farm equipment, boats, airplanes, etc. In one example, a motor vehicle includes a vehicle body with an engine compartment, and a vented engine hood assembly extending across and covering the engine compartment. The vented engine hood assembly includes a transparent or translucent glass center panel and a liftgate closure panel that is movably mounted to the vehicle body. The liftgate closure panel includes one or more closure panels defining therethrough a central window.

The foregoing vented engine hood assembly also includes a venting module comprising or consisting essentially of an arcuate carrier frame that is integrally formed with a mesh screen, a support flange, and a plurality of attachment tabs. The carrier frame is seated within the central window of the liftgate closure panel and circumscribes most or all of the glass center panel. The support flange projects inwardly from and extends continuously along an inner perimeter of the carrier frame. The glass center panel is mounted on the support flange, e.g., via adhesive bonding. In contrast, the attachment tabs are spaced around and project from an outer perimeter of the carrier frame. These attachment tabs mount the venting module to the liftgate closure panel and, thus, the vehicle body, e.g., via threaded fasteners. The mesh screen extends between the inner and outer perimeters of the arcuate carrier frame. The mesh screen has a lattice mesh core with an interstice array having a predetermined thermal venting area.

According to other aspects of the present disclosure, methods of making and methods of using vehicle venting modules are presented. For instance, a method of constructing a venting module for a compartment cover assembly of a motor vehicle is disclosed. The compartment cover assembly includes a center panel and a closure panel, which attaches to the motor vehicle. The method includes: forming an arcuate carrier frame that is configured to seat within a window of the closure panel and circumscribe at least a portion of the center panel; attaching a support flange to the arcuate carrier frame, wherein the support flange projects from the arcuate carrier frame and is configured to attach to the center panel of the compartment cover assembly; attaching an attachment tab to the arcuate carrier frame, wherein the attachment tab projects from the arcuate carrier frame and is configured to attach to the closure panel of the compartment cover assembly; and attaching a mesh screen to the arcuate carrier frame, wherein the mesh screen includes a lattice mesh structure with an interstice array having a predetermined thermal venting area. For some configurations, the lattice mesh structure is engineered with a predetermined thermal venting area of at least about 62,000 mm$^2$. The attaching steps of the method may include casting the carrier frame, the support flange, the attachment tab, and the mesh screen as a single-piece, unitary structure.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
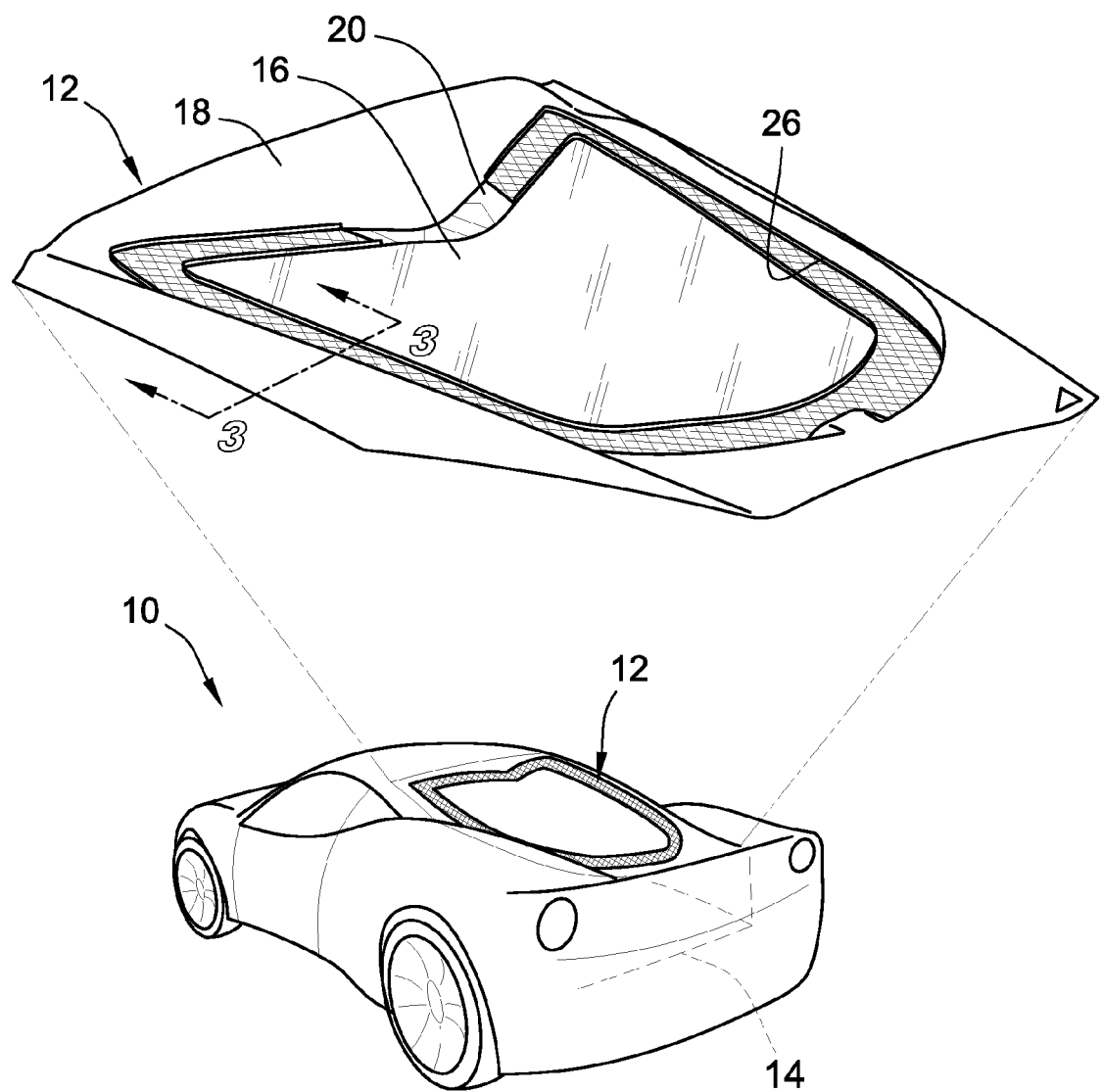
FIG. 1 is a rear perspective-view illustration of a representative motor vehicle with a vented compartment cover assembly in accordance with aspects of the present disclosure.

The present disclosure is susceptible to various modifications and alternative forms, and some representative embodiments have been shown by way of example in the drawings and will be described in detail herein. It should be understood, however, that the inventive aspects of this disclosure are not limited to the particular forms disclosed. Rather, the disclosure is to cover all modifications, equivalents, combinations, subcombinations, and alternatives falling within the spirit and scope of the disclosure as defined by the appended claims.

DETAILED DESCRIPTION OF THE ILLUSTRATED EMBODIMENTS

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a perspective-view illustration of a representative automobile, designated generally at 10, with an assortment of compartment cover assemblies, which are collectively represented herein by a vented engine hood assembly 12. Mounted at a medial portion of the automobile 10, e.g., to a liftgate frame of the vehicle body aft of the passenger compartment, the engine hood assembly 12 extends across and covers the engine compartment (shown hidden at 14) of a mid-engine or rear-engine automobile 10. The automobile 10—also referred to herein as "motor vehicle" or "vehicle" for short—is merely an exemplary application with which the inventive aspects of this disclosure can be practiced. In the same vein, the implementation of the present concepts into an engine hood assembly should also be appreciated as an exemplary application of the inventive concepts disclosed herein. As such, it should be understood that the aspects and features of the present disclosure can be integrated into other vehicle compartment cover assemblies and utilized for any type of motor vehicle. Lastly, the drawings presented herein, are not necessarily to scale and are provided purely for instructional purposes. Thus, the specific and relative dimensions shown in the drawings are not to be construed as limiting.

Vented engine hood assembly 12 of FIG. 1 can be pivotably mounted, e.g., via a dual-point hinge with pneumatic cylinder actuators, to the vehicle body's liftgate frame to provide access to and securely close a portion of the engine compartment 14. The engine hood assembly 12 can be provided with a concealed latch system (not shown) for securing the hood assembly 12 in a closed position. A hood latch handle of the latch system, which may be located inside the passenger compartment, e.g., underneath the steering column or adjacent the driver seat frame, is pulled, pivoted or otherwise activated to apply a tensile force to a hood release cable. The loaded hood release cable, which may be of the Bowden cable type, activates a spring-biased hood latch assembly at the distal end of the engine hood assembly 12 opposite the hinge mount. This allows the engine hood assembly 12 to be moved to an open position, e.g., under the biasing force of one or more air cylinders. Other mounting and latching mechanisms are envisioned as being within the scope of the present disclosure, as those illustrated in the drawings are merely representative and non-limiting.

Figure 3:
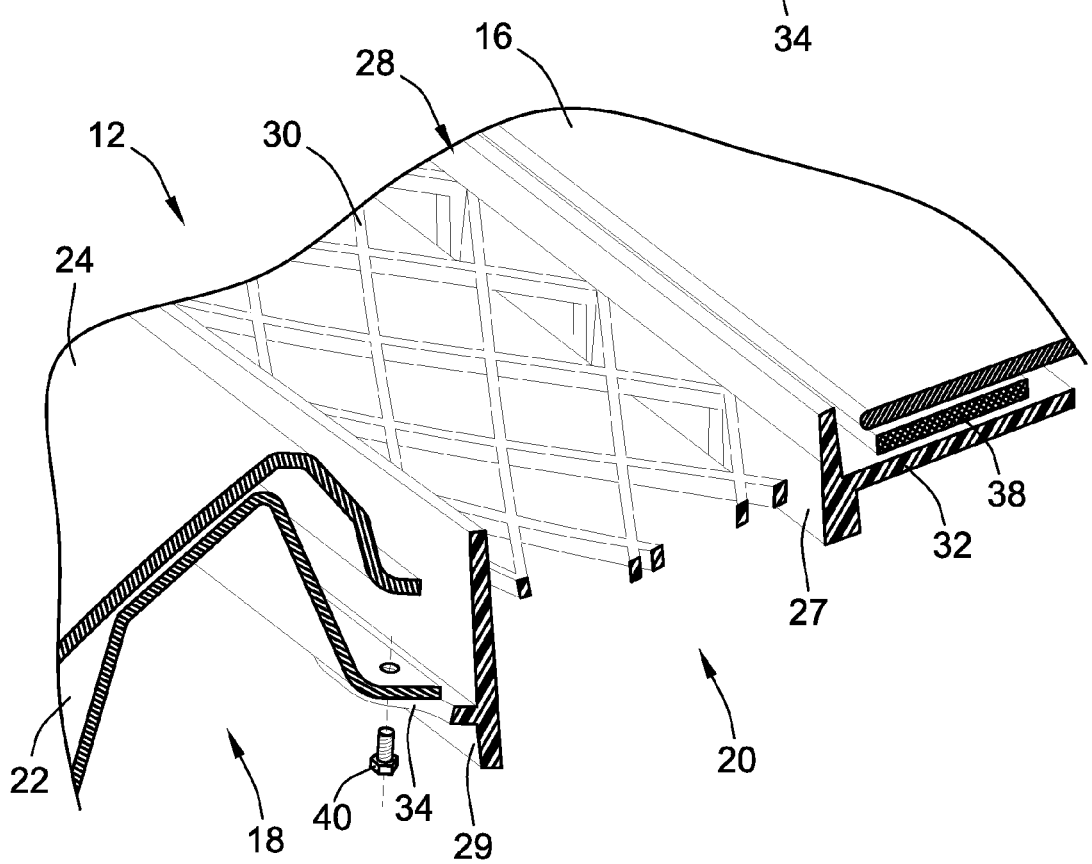
FIG. 3 is a perspective-view illustration of the representative vented compartment cover assembly of FIG. 1 shown partially cut away along section line 3-3 of FIG. 1.

With continuing reference to FIG. 1, the vented engine hood assembly 12 (also referred to herein as "compartment cover assembly") includes a center panel 16, a closure panel 18, and a venting module 20. Commonly referred to as a liftgate panel assembly, the closure panel 18 can be a two-ply construction, i.e., the panel 18 is illustrated in FIG. 3 with a first (inner) closure panel 22 in juxtaposition with and joined to a second (outer) closure panel 24. Outer closure panel 24 defines the upper (A) surface of the closure panel 18, which can be characterized by aesthetically appealing contours and paint. Inner closure panel 22, by contrast, functions as a subjacent support structure that extends below panel 24, with the periphery of inner closure panel 22 hemmed around the periphery of outer closure panel 24. These two panels 22, 24 cooperatively define a window 26 that extends through a central portion of the closure panel 18. Center panel 16, which may be a transparent or translucent back glass panel, is nested within the window 26 and circumscribed by the closure panel 18. This closure panel 18 functions as the mounting support member for attaching the engine hood assembly 12 to the motor vehicle's 10 vehicle structure. Consistent with the explanation provided above, liftgate closure panel 18 can be pivotably mounted via one or more peripheral hinges to a cross-pillar of the vehicle body's liftgate frame aft of the passenger compartment's rear deck.

Figure 2:
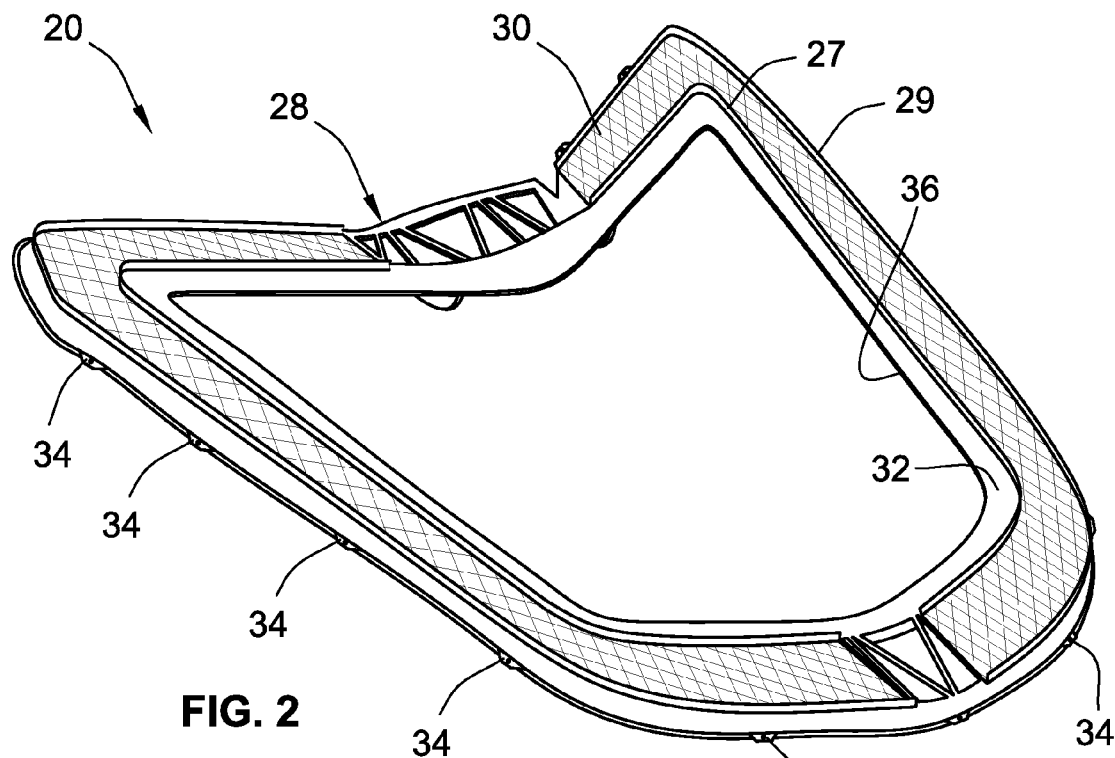
FIG. 2 is a perspective-view illustration of the venting glass module of the representative vented compartment cover assembly of FIG. 1.
Figure 4:
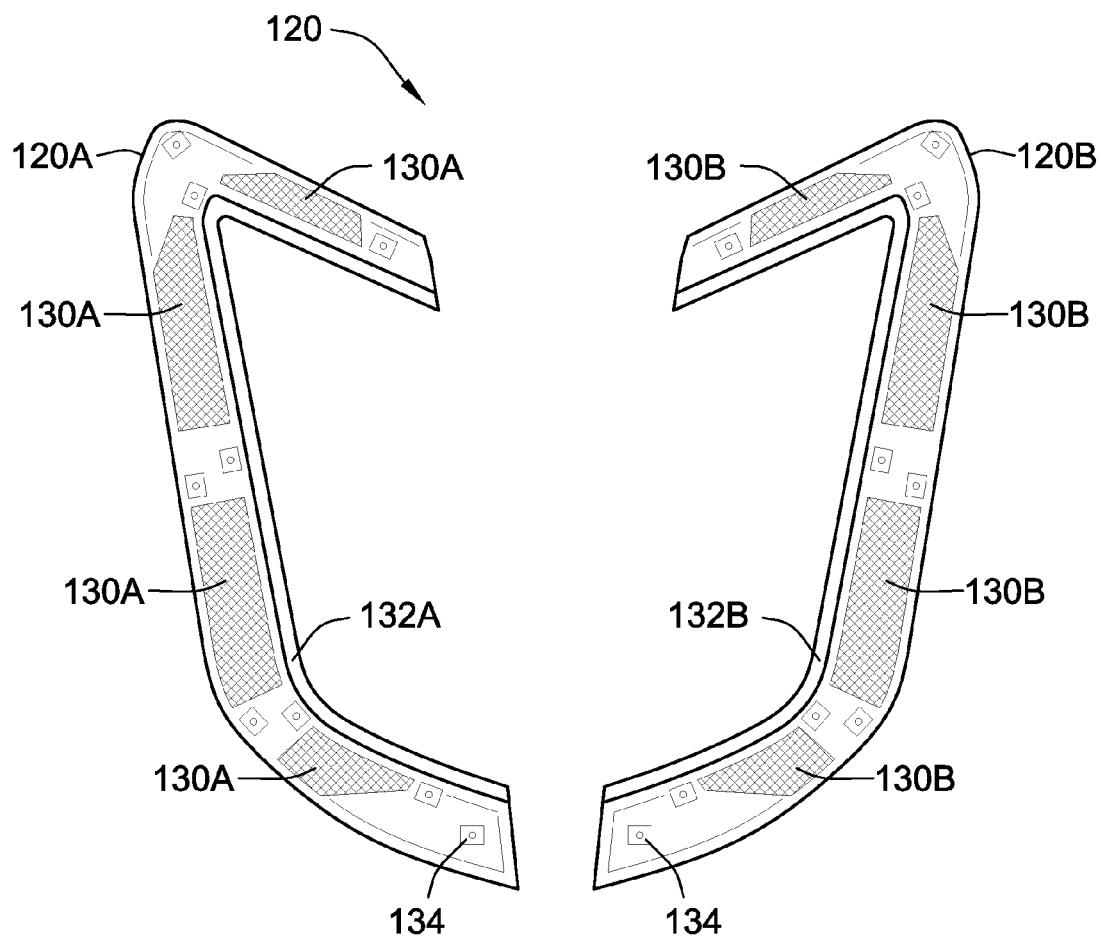
FIG. 4 is a perspective-view illustration of another representative venting glass module for a compartment cover assembly of a motor vehicle in accordance with aspects of the present disclosure.

Seated within the central window 26 of the liftgate closure panel 18, circumscribing some or all of the glass center panel 16, is a venting module 20. According to the illustrated example of FIGS. 2 and 3, the venting module 20 is constructed with an arcuate carrier frame 28, a mesh screen 30, a support flange 32, and one or more attachment tabs 34. It is desirable, for at least some configurations, that the venting module 20—i.e., the frame 28, screen 30, flange 32 and tabs 34—be formed (e.g., cast from magnesium or other metallic material) as a single-piece, unitary structure. Alternatively, these elements can be fabricated as two or more separate parts that are subsequently joined together to form the venting module 20. While any of an assortment of shapes and sizes are envisioned, the representative arcuate carrier frame 28 is shown in FIG. 2 comprising two juxtaposed, symmetrical halves that define a continuous inner perimeter that surrounds the entire glass center panel 16 and a continuous outer perimeter that extends continuously around the inner perimeter of the closure panel window 26. Optional configurations may comprise a venting module 120 (FIG. 4) with two symmetrical (bow-shaped) sections 120A and 120B that define discontinuous inner and outer perimeters that are coterminous with only select portions of the center panel 16 and the closure panel window 26, respectively. While differing in appearance, it is envisioned that any of the features disclosed with reference to the embodiment of FIG. 4 can be incorporated, singly or in any combination, into the embodiment of FIG. 2, and vice versa.

Continuing with the example of FIG. 2, the venting module support flange 32 projects inwardly from an inner wall 27 of the arcuate carrier frame 28, e.g., at a generally orthogonal angle. As shown, the support flange 32 extends continuously along the length of the inner wall 27 and, thus, around the entire inner perimeter of the carrier frame 28. The inner wall 27 and support flange 32 cooperatively define a venting module window 36, within which is nested the glass center panel 16. Optional configurations may comprise a venting module, such as venting glass module 120 of FIG. 4, with a disjointed, multi-section support flange—e.g., first and second support flanges 132A and 132B, respectively, that each projects inwardly from a respective inside wall of the carrier frame sections 120A, 120B of FIG. 4. In either case, the support flange 32 (or flanges 132A, 132B) provides a subjacent backing surface for mounting the center panel 16 of the engine hood assembly 12. By way of non-limiting example, the center panel 16 is mounted onto the support flange 32 via a glass bonding adhesive 38.

One or more attachment tabs 34 project outwardly from an outer wall 29 of the arcuate carrier frame 28, e.g., at an oblique angle. As shown, assorted attachment tabs 34 are spaced circumferentially about the outer perimeter of the arcuate carrier frame 28. Similar to the frame 28 and flange 32, the number, geometry and arrangement of the attachment tabs 34 can be varied from that which are shown in the drawings, for example, to accommodate the design parameters of a different compartment cover assembly. For instance, optional configurations may comprise a venting module 120 (FIG. 4) with attachment tabs 134 that extend inwardly from opposing inner and outer side walls 127 and 129, respectively. These attachment tabs 34 provide coupling interfaces for attaching the venting module 20 and, thus, the glass center panel 16 to the closure panel 18 of the engine hood assembly 12. In particular, each attachment tab 34 is configured to receive therethrough a threaded fastener 40, such as a screw or a bolt, which is then passed into the inner closure panel 22 to mechanically couple the carrier frame 28 to the closure panel 18.

To provide improved radiative and convective cooling for the automobile's 10 engine compartment 14, a mesh screen 30 is interposed with the center panel 16 and closure panel 22, extending between and connecting the inner and outer walls 27, 29 of the arcuate carrier frame 28. According to the example illustrated in FIG. 2, the mesh screen 30 extends substantially continuously along the length of the two walls 27, 29 and, thus, around the perimeter of the carrier frame 28. Optional configurations may comprise a venting module 120 (FIG. 4) with a plurality of mesh screens 130A and 130B located at discrete positions along the arcuate carrier frame 120. The number, shapes and locations of the mesh screen 30/screens 130A, 130B can be varied from that which are shown in the drawings. However, it is desirable, in at least some configurations, to incorporate a substantially continuous mesh screen to thereby increase the venting area and cooling properties of the venting module 20. Irrespective of geometry and size, the mesh screen 30 must exhibit sufficient strength and resiliency to support the glass center panel 16.

Figure 5:
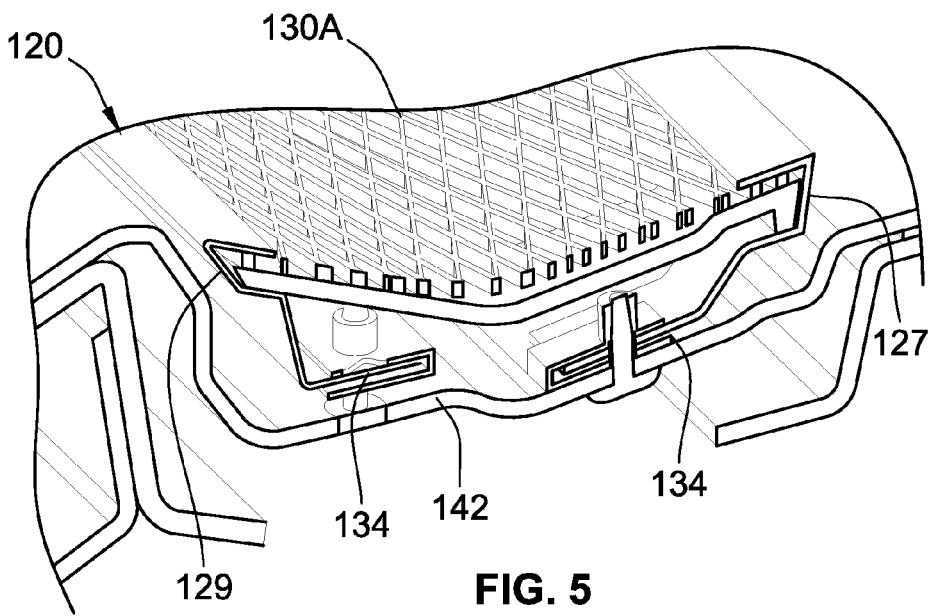
FIG. 5 is a partially cut away perspective-view illustration of a representative vented compartment cover assembly with the venting glass module of FIG. 4.

As opposed to granular porous media, nanoporous media, reticulated foam media, and like porous structure, the mesh screen 30 can be seen in FIG. 3 comprising a lattice mesh structure—i.e., an open framework of interconnected strips of metal, plastic, or other rigid material that are interlaced or otherwise crossed to form a repeating pattern of shapes, such as diamonds, squares, rectangles, hexagons, etc. For at least some configurations, the lattice mesh structure is arranged in a non-woven diamond-shaped mesh pattern. This type of open framework pattern provides an interstice array of venting channels that collectively define a predetermined thermal venting area—i.e., the total cross-sectional area across which convective and/or radiative heat can be transferred. It is desirable, for at least some embodiments, that the mesh screen 30 exhibit a predetermined thermal venting area of at least about 62,000 mm² and, for at least some embodiments, a predetermined thermal venting area of between about 70,000 mm² to about 150,000 mm². Optional configurations may include a venting module 120 that is provided with an optional stamped (steel/aluminum) tub 142 (FIG. 5) that hides body color visible through mesh 130A.

While aspects of the present disclosure have been described in detail with reference to the illustrated embodiments, those skilled in the art will recognize that many changes may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and aspects.

What is claimed:

1. A venting module for a compartment cover assembly of a motor vehicle, the compartment cover assembly including a center panel and a closure panel, the closure panel being configured to attach to vehicle structure of the motor vehicle and including a window, the venting module comprising:
    an arcuate carrier frame configured to seat within the window of the closure panel and circumscribe the center panel, the arcuate carrier frame including opposing inner and outer walls, the outer wall defining a continuous outer perimeter configured to extend continuously around an inner perimeter of the window, and the inner wall defining a continuous inner perimeter configured to surround the center panel;
    a support flange projecting inwardly from the inner wall of the arcuate carrier frame at a generally orthogonal angle, the support flange being configured to support thereon and attach to the center panel of the compartment cover assembly;
    an attachment tab projecting outwardly from the outer wall of the arcuate carrier frame at an oblique angle, the attachment tab being configured to attach to the closure panel and thereby mount the venting module to the compartment cover assembly; and
    a mesh screen interposed between and attaching together the inner and outer walls of the arcuate carrier frame, the mesh screen extending substantially continuously around a circumference of the carrier frame, the mesh screen including a lattice mesh structure with an interstice array having a predetermined thermal venting area.

2. The venting module of claim 1, wherein the predetermined thermal venting area is at least about 62,000 mm².

3. The venting module of claim 2, wherein the predetermined thermal venting area is between about 70,000 mm² to about 150,000 mm².

4. The venting module of claim 1, wherein the lattice mesh structure includes a non-woven diamond-shaped mesh pattern.

5. The venting module of claim 1, wherein the support flange extends continuously along the length of the inner perimeter of the arcuate carrier frame.

6. The venting module of claim 1, wherein the attachment tab comprises a plurality of attachment tabs spaced about and projecting outwardly from the outer perimeter of the arcuate carrier frame.

7. The venting module of claim 1, wherein the support flange is configured to mount thereon the center panel via a glass bonding adhesive.

8. The venting module of claim 1, wherein the attachment tab is configured to mount to the closure panel via a threaded fastener.

9. The venting module of claim 1, wherein the mesh screen includes a plurality of mesh screens located at discrete positions along the arcuate carrier frame.

10. The venting module of claim 1, wherein the inner and outer walls of the arcuate carrier frame are parallel to each other.

11. The venting module of claim 1, wherein the carrier frame, the support flange, the attachment tab, and the mesh screen are integrally formed as a single-piece, unitary structure.

12. A motor vehicle, comprising:
    a vehicle body with an engine compartment; and
    a vented engine hood assembly extending across and covering the engine compartment, the vented engine hood assembly including:
        a liftgate closure panel movably mounted to the vehicle body, the liftgate closure panel defining therethrough a central window;
        a transparent or translucent glass center panel;
        a venting module comprising a carrier frame integrally formed with a mesh screen, a support flange, and a plurality of attachment tabs, the carrier frame being seated within the central window of the liftgate closure panel and circumscribing the glass center panel, the carrier frame including an outer wall defining a continuous outer perimeter extending continuously along an inner perimeter of the central window, and an inner wall defining a continuous inner perimeter surrounding the center panel, the support flange projecting inwardly from the inner wall at a generally orthogonal angle and extending along the inner perimeter of the carrier frame, the glass center panel being mounted on the support flange, the attachment tabs being spaced around and projecting outwardly from the outer wall of the carrier frame at an oblique angle, the attachment tabs mounting the venting module to the liftgate closure panel, and the mesh screen extending between and attaching together the inner and outer walls of the arcuate carrier frame, the mesh screen extending substantially continuously around a circumference of the carrier frame, wherein the mesh screen has a lattice mesh core with an interstice array having a predetermined thermal venting area.

13. A method of constructing a venting module for a compartment cover assembly of a motor vehicle, the compartment cover assembly including a center panel and a closure panel, the closure panel being configured to attach to vehicle structure of the motor vehicle and including a window, the method comprising:
    forming an arcuate carrier frame configured to seat within the window of the closure panel and circumscribe the center panel, the arcuate carrier frame including opposing inner and outer walls, the outer wall defining a continuous outer perimeter configured to extend continuously around an inner perimeter of the window, and the inner wall defining a continuous inner perimeter configured to surround the center panel;

attaching a support flange to the arcuate carrier frame, the support flange projecting inwardly from the inner wall of the arcuate carrier frame at a generally orthogonal angle, the support flange being configured to support thereon and attach to the center panel of the compartment cover assembly;

attaching an attachment tab to the arcuate carrier frame, the attachment tab projecting outwardly from the outer wall of the arcuate carrier frame at an oblique angle, the attachment tab being configured to attach to the closure panel and thereby mount the venting module to the compartment cover assembly; and attaching a mesh screen to the arcuate carrier frame interposed between and connecting the inner and outer walls, the mesh screen extending substantially continuously around a circumference of the carrier frame, the mesh screen including a lattice mesh structure with an interstice array having a predetermined thermal venting area.

14. The method of claim 13, wherein the predetermined thermal venting area is at least about 62,000 mm².

15. The method of claim 13, wherein the lattice mesh structure includes a non-woven diamond-shaped mesh pattern.

16. The method of claim 13, wherein the support flange extends continuously along the length of the inner perimeter of the arcuate carrier frame.

17. The method of claim 13, wherein the attachment tab comprises a plurality of attachment tabs spaced about and projecting outwardly from the outer perimeter of the arcuate carrier frame.

18. The method of claim 13, wherein the support flange is configured to mount thereon the center panel via a glass bonding adhesive, and wherein the attachment tab is configured to mount to the closure panel via a threaded fastener.

19. The method of claim 13, wherein the inner and outer walls of the arcuate carrier frame are parallel to each other.

20. The method of claim 13, wherein the attaching steps include casting the carrier frame, the support flange, the attachment tab, and the mesh screen as a single-piece, unitary structure.

* * * * *